(12) United States Patent
Viatte

(10) Patent No.: US 8,978,870 B2
(45) Date of Patent: Mar. 17, 2015

(54) DEVICE FOR CONVEYING BUNDLES FOR A STRAPPING MACHINE

(75) Inventor: Olivier Viatte, Cugy (CH)

(73) Assignee: Bobst Mex SA (CH)

( * ) Notice: Subject to any disclaimer, the term of this patent is extended or adjusted under 35 U.S.C. 154(b) by 86 days.

(21) Appl. No.: 13/821,360

(22) PCT Filed: Aug. 19, 2011

(86) PCT No.: PCT/EP2011/004184
§ 371 (c)(1),
(2), (4) Date: Mar. 7, 2013

(87) PCT Pub. No.: WO2012/038013
PCT Pub. Date: Mar. 29, 2012

(65) Prior Publication Data
US 2013/0168207 A1 Jul. 4, 2013

(30) Foreign Application Priority Data
Sep. 22, 2010 (EP) .................................... 10010184

(51) Int. Cl.
*B65G 47/26* (2006.01)
*B65G 37/00* (2006.01)
*B65H 31/30* (2006.01)

(52) U.S. Cl.
CPC ............ *B65G 37/00* (2013.01); *B65H 31/3081* (2013.01); *B65H 2701/1766* (2013.01); *B65H 2801/81* (2013.01)
USPC ..................... 198/418.7; 198/612; 414/794.7; 414/798.6

(58) Field of Classification Search
USPC ................... 198/418.7, 612, 613, 726, 418.2; 414/790.4, 790.6, 794.4, 794.7, 798.6
See application file for complete search history.

(56) References Cited

U.S. PATENT DOCUMENTS

| | | | | |
|---|---|---|---|---|
| 3,889,824 A | * | 6/1975 | Wood | 414/790.3 |
| 6,182,814 B1 | * | 2/2001 | Koehler | 198/418.7 |
| 7,588,239 B2 | * | 9/2009 | Marcinik et al. | 198/726 |
| 8,162,130 B2 | * | 4/2012 | Rabec | 198/617 |
| 8,672,117 B2 | * | 3/2014 | Stahl | 198/418.2 |
| 2007/0147981 A1 | * | 6/2007 | Moncrief et al. | 414/798.6 |
| 2012/0027562 A1 | * | 2/2012 | Pocaterra et al. | 198/418.7 |

FOREIGN PATENT DOCUMENTS

| | | |
|---|---|---|
| EP | 0 553 724 A1 | 8/1993 |
| EP | 0 626 330 A2 | 11/1994 |
| EP | 1 293 459 A1 | 3/2003 |
| EP | 2 157 038 A1 | 2/2010 |
| EP | 2 192 067 A1 | 6/2010 |

OTHER PUBLICATIONS

International Search Report dated Nov. 28, 2011 issued in corresponding International Application No. PCT/EP2011/004184.

* cited by examiner

Primary Examiner — James R Bidwell
(74) Attorney, Agent, or Firm — Ostrolenk Faber LLP

(57) ABSTRACT

A conveyance device 1 for movement, within a strapping machine 100, of a succession of bundles 2 of flat objects. A first conveyor 10 moves each bundle 2 from an assembly zone to a transfer zone. A second conveyor 40 moves each bundle 2 from the transfer zone to a strapping zone. The first conveyor 10 longitudinally guides the stack of flat objects during the formation of each bundle 2 in the assembly zone, and longitudinally holds the bundle 2 during its movement from the assembly zone to the transfer zone.

14 Claims, 6 Drawing Sheets

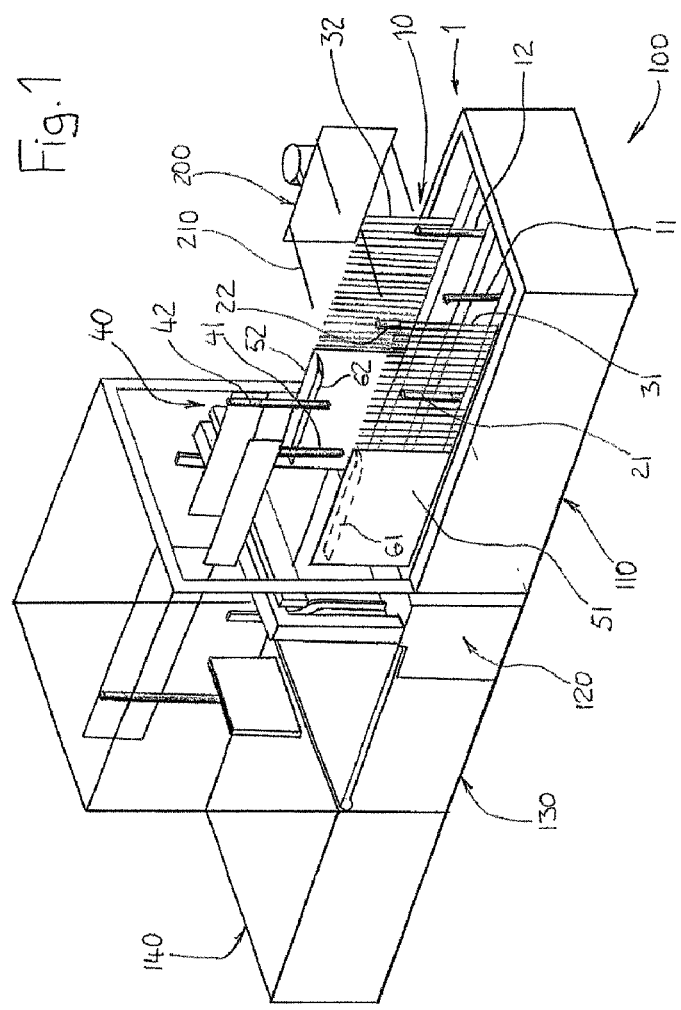

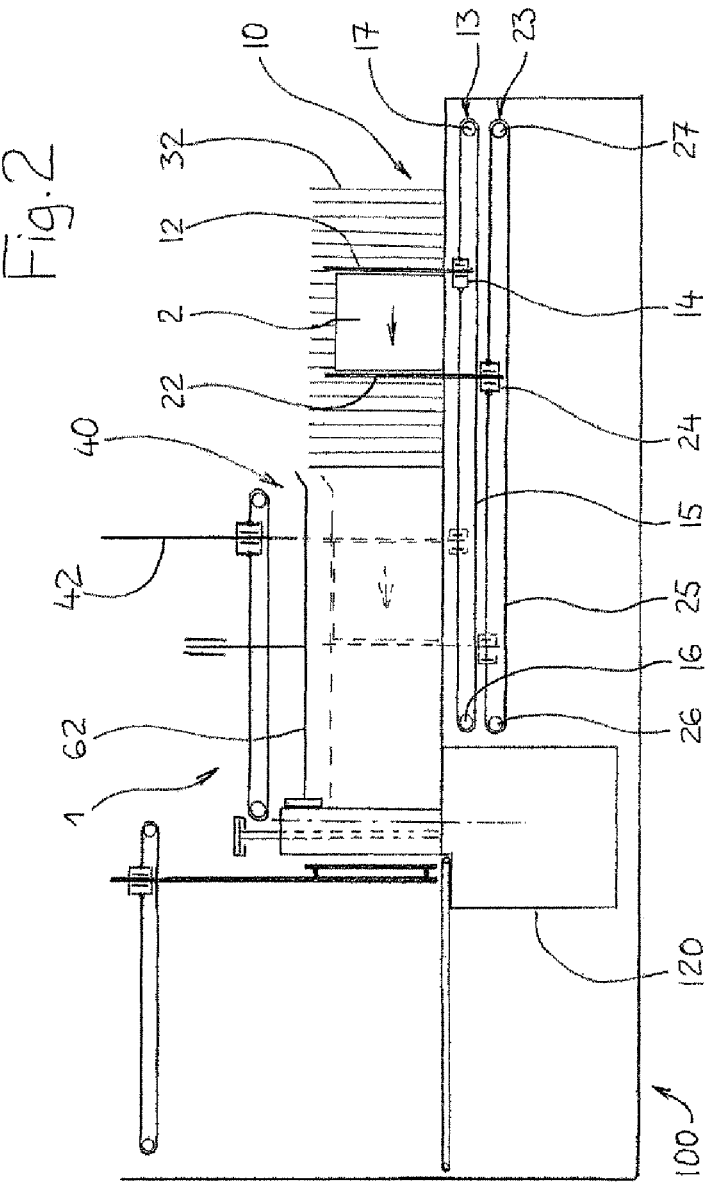

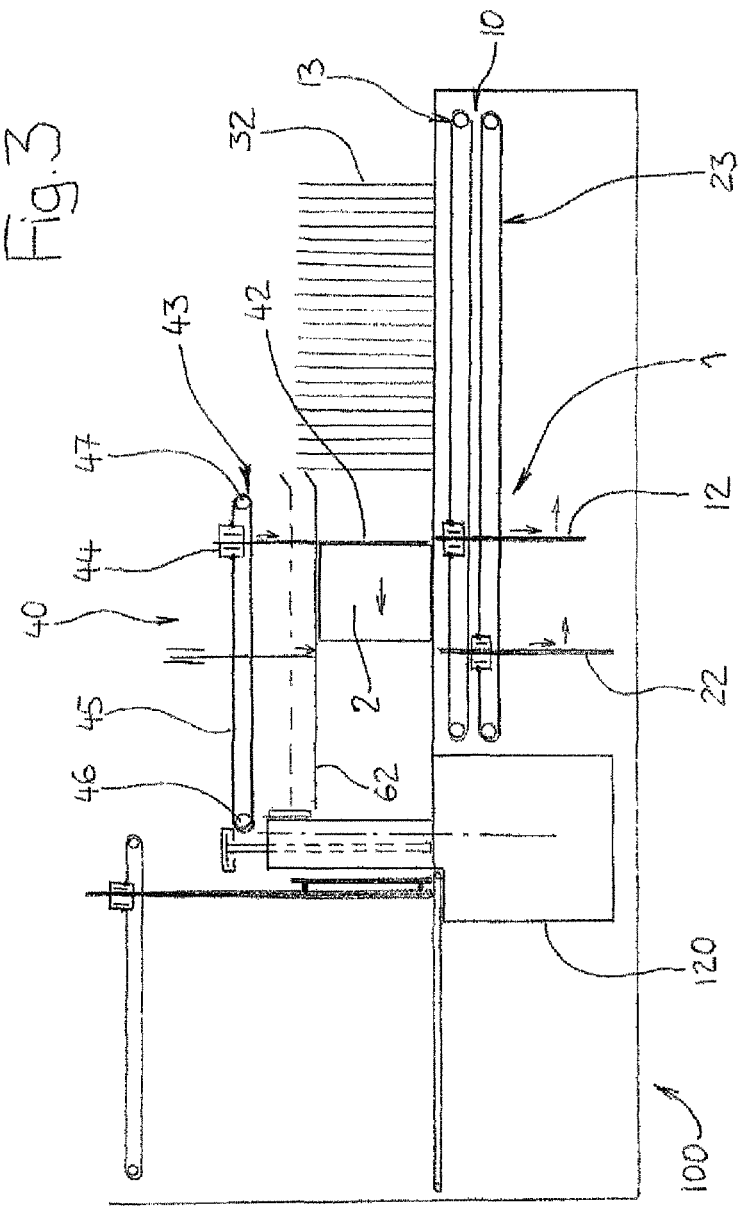

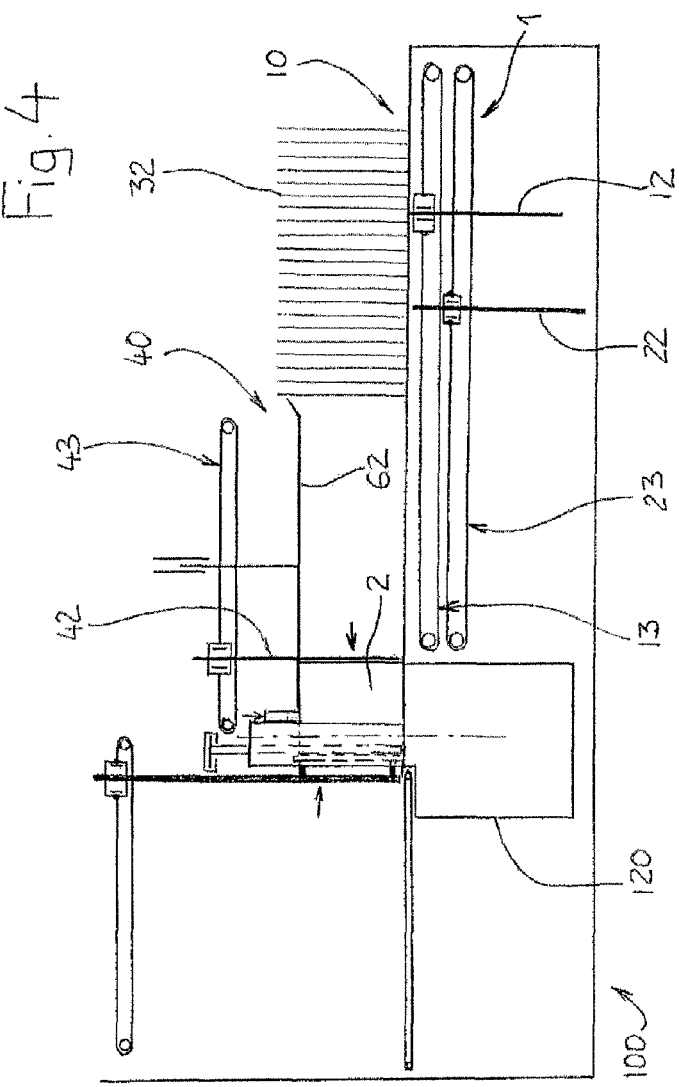

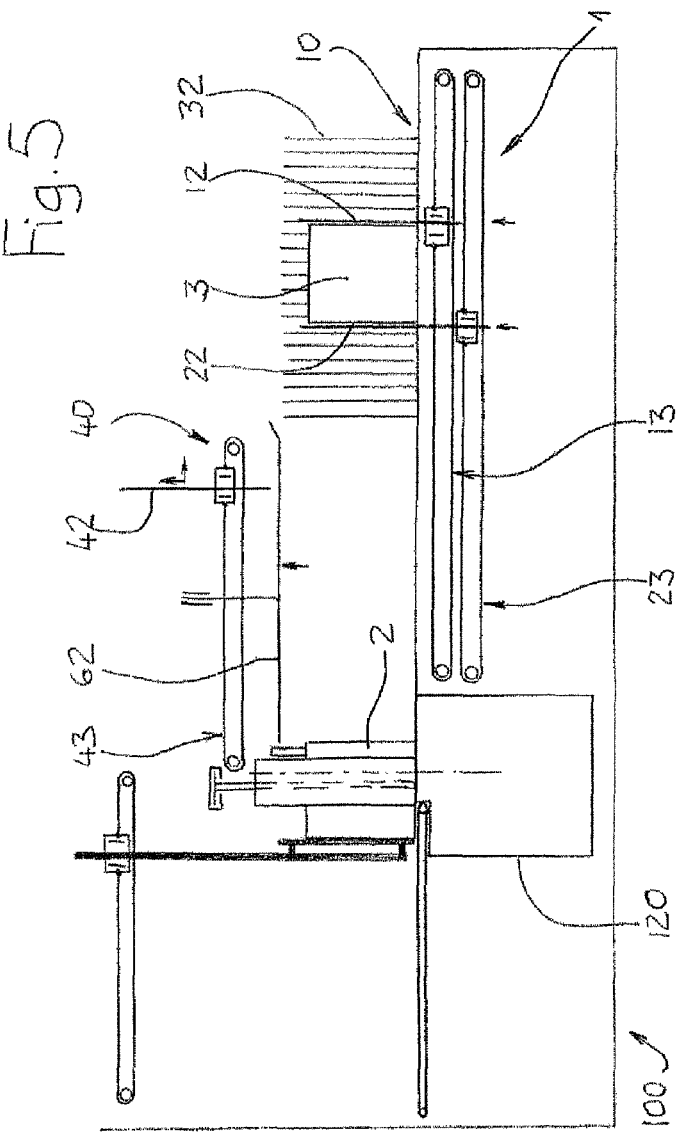

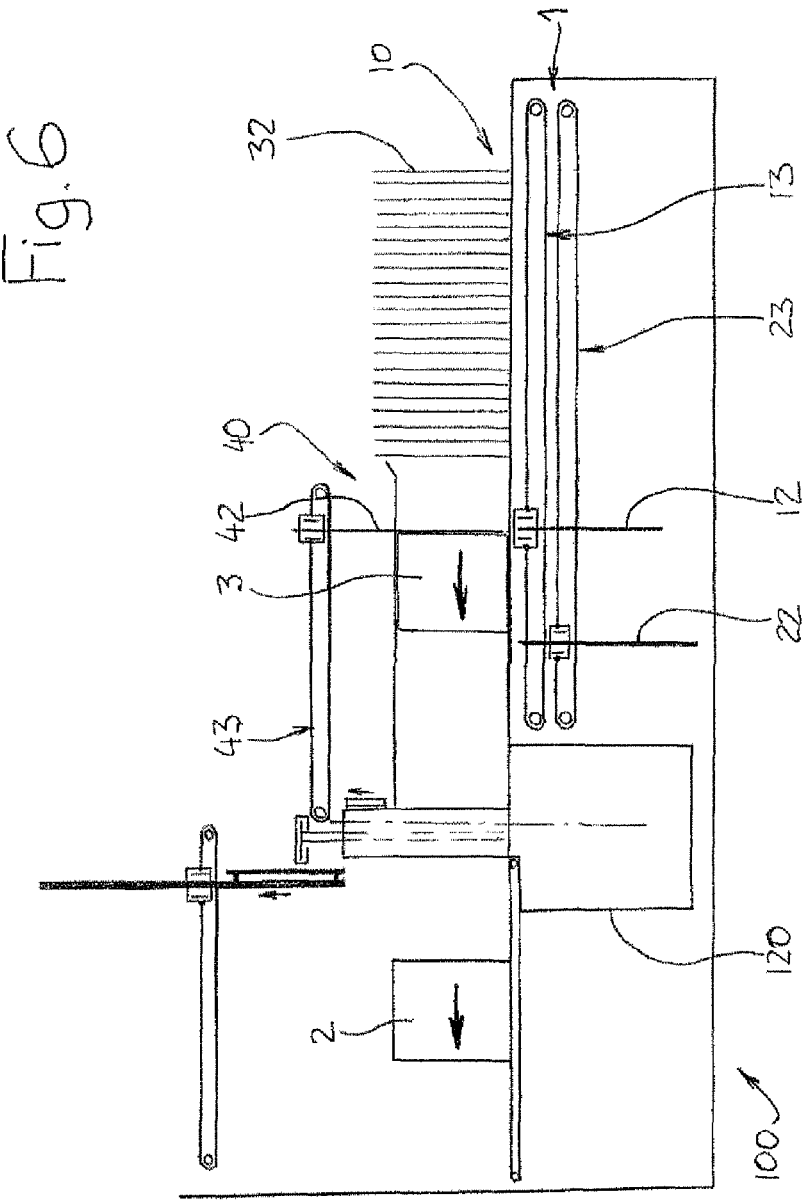

DEVICE FOR CONVEYING BUNDLES FOR A STRAPPING MACHINE

CROSS-REFERENCE TO RELATED APPLICATIONS

The present application is a 35 U.S.C. §§371 national phase conversion of PCT/EP2011/004184, filed Aug. 19, 2011, which claims priority of European Patent Application No. 10010184.9, filed Sep. 22, 2010, the contents of which are incorporated by reference herein. The PCT International Application was published in the French language.

BACKGROUND OF THE INVENTION

The present invention relates to a device making it possible to convey flat objects stacked in bundles, through a machine responsible for tying each of said bundles.

The invention finds a particularly advantageous application in the packaging field.

In the packaging industry, the manufacture of folding boxes is conventionally carried out on line, by folding and gluing blanks by means of machines commonly called folder-gluers. Usually, the folding boxes are delivered in the form of a continuous stream, so that it is appropriate to package them in bundles when said boxes are designed to be stored before their first use.

In this situation, it is known practice to package the folding boxes in the form of strapped bundles, that is to say stacks of boxes that are attached individually by means of one or more tying elements. Various types of strapping means can be used to accomplish this task, depending on whether it is desired, for example, to bind each bundle by means of at least one thin tying element such as a string, strap each bundle by means of at least one narrow tying element such as a strap, or wrap each bundle using at least one broad tying element such as a band.

In a standard strapping machine, two zones are of more particular importance. They are first of all the assembly zone which is situated at the entrance of the machine and which is designed for the formation of each bundle, and there is then the strapping zone which is positioned nearer to the heart of the machine, and which, for its part, is dedicated to the tying of each bundle. Naturally, a conveyance device is provided to ensure the individual movement of each bundle through the strapping machine, notably from the assembly zone to the strapping zone.

In practice, such a movement is conventionally carried out in two stages in order to be able to have reduced cycle times. This feature involves the existence of an intermediate zone, namely a transfer zone which is logically situated between the assembly zone and the strapping zone. However it may be, it is for this reason that this type of conveyance device usually uses two distinct conveying means.

In reality, first conveying means move each bundle from the assembly zone to the transfer zone, while second conveying means are responsible for moving said bundle from the transfer zone to the strapping zone. In this situation, the purpose of the first conveying means is primarily to rapidly clear the assembly zone in order to be able to begin forming another bundle as quickly as possible. The responsibility of the second conveying means is however to feed the strapping means with bundles with no idle time.

In view of this, a strapping machine is known notably from the prior art that is used to tie together folding boxes assembled in bundles, and which has such a device for conveying bundles. In this machine, the formation of each bundle is carried out by successive deposits of batches of boxes, in the middle of four bracket-shaped guides that are placed vertically at the four corners of the stack. The two downstream guides are provided with movable stops the retraction of which allows extraction to the front of the bundle. The first conveying means consist of a pneumatic pusher which is capable of pushing the bundle from behind when the latter is complete in order to extract it from the guides and bring it to the second conveying means. These second conveying means, for their part, take the form of an association of conveyor belts that consists of a horizontal belt, two vertical belts and one top conveyor belt which all turn in the same direction and at the same speed.

This type of conveyance device however has the drawback of being complicated to adjust, both in the position of the guides of the assembly zone, and in the synchronization of the conveyor belts of the second conveying means.

Another major drawback of such a conveyance device lies in the fact that it is insufficiently accurate in terms of guidance. Consideration here is given in particular to the poor effectiveness of the vertical guides of the assembly zone when the pneumatic pusher is set in motion, but also to that of the conveyor belts because of the friction that unavoidably occurs when the bundles pass.

SUMMARY OF THE INVENTION

Therefore, the technical problem to be resolved by the subject of the present invention is to provide a conveyance device for the movement, within a strapping machine, of a succession of bundles consisting of stacked flat objects, comprising first conveying means capable of moving each bundle from an assembly zone in which said bundle is formed from a stacking of flat objects, to a transfer zone in which said bundle is positioned outside the assembly zone, and second conveying means capable of moving each bundle from the transfer zone to a strapping zone in which the flat objects comprising said bundle are attached together, a conveyance device that would make it possible to prevent the problems of the prior art by providing notably substantially increased effectiveness, while being easier to adjust.

The solution to the technical problem posed consists, according to the present invention, in that the first conveying means are also capable of longitudinally guiding the stack of the flat objects during the formation of each bundle in the assembly zone, and of longitudinally holding said bundle during its movement from the assembly zone to the transfer zone.

It is important to emphasize that the invention applies to any strapping machine irrespective of the tying technique used. A conveyance device according to the invention may specifically be fitted without distinction to a machine capable of binding each bundle by means of at least one thin tying element such as a string, a machine responsible for strapping each bundle by means of at least one narrow tying element such as a strap, a machine capable of wrapping each bundle by using at least one wide tying element such as a band, or more generally a machine capable of individually attaching each bundle by any combination of tying elements of any kind and dimensions. This means in common terms that the strapping machine may notably be a binding machine, a strapping machine or a wrapping machine.

Whatever the case, the invention as thus defined has the advantage of ensuring an extremely precise movement of the bundles through the strapping machine. Specifically, in addition to their conventional conveyance function, the first conveying means play two additional roles that are nevertheless complementary to their conveyance function. They are more particularly a guidance role that is performed during the formation of the bundles and a holding role which is carried out during the movement of said bundles.

The present invention also relates to the features that will emerge in the course of the following description and which must be considered in isolation or in all their technically possible combinations.

This description, given as a nonlimiting example, is designed to make it more easily understood what the invention consists of and how it can be embodied. The description is also given with reference to the appended drawings in which:

BRIEF DESCRIPTION OF THE DRAWINGS

FIG. 1 represents in perspective a strapping machine which is fitted with a conveyance device according to the invention.

FIGS. 2 to 6 are sections that illustrate five phases of the movement sequence of the bundles inside the strapping machine.

FIG. 2 shows a first phase which is characterized by the presence of a bundle in the assembly zone.

FIG. 3 shows a second phase during which the bundle is positioned in the transfer zone.

FIG. 4 relates to a third phase which corresponds to the arrival of the bundle in the strapping zone, and to the placement of a first tying element around said bundle.

FIG. 5 shows a fourth phase during which a second assembly tying element is placed around the bundle.

FIG. 6 shows a fifth phase which is characterized by the discharge of the bundle.

DESCRIPTION OF AN EMBODIMENT

For reasons of clarity, the same elements have been indicated by identical reference numbers. Similarly, only the elements that are essential to the understanding of the invention have been shown, and this is done with no regard to scale and in a schematic manner.

FIGS. 1 to 6 illustrate a strapping machine 100 that is designed to be incorporated as a module in a packing machine designed for transforming a continuous stream of folding boxes coming out of a folder-gluer, into a succession of strapped bundles ready to be handled and/or stored.

As its name indicates, the strapping machine 100 is more particularly responsible for tying stacks of folding boxes, forming bundles 2, 3, which are formed all upstream of said machine 100, in this instance at an assembly table 110. To fulfill its function, the strapping machine 100 has a strapping unit 120 which is capable of attaching together the flat objects of each bundle 2, 3 and which is incorporated permanently into an enclosure 130 placed at the outlet of the assembly table 110. Once strapped, the bundles 2, 3 are then made available at a delivery table 140 which is positioned directly downstream of the enclosure 130.

As can be seen in all the figures, the movement of the bundles 2, 3 of folding boxes through the strapping machine 100 is carried out by a conveyance device 1. The latter is first of all furnished with first conveying means 10 which are responsible for moving each bundle 2, 3 from an assembly zone in which said bundle 2, 3 is formed from a stacking of folding boxes (FIG. 2), to a transfer zone in which said bundle 2, 3 is positioned outside the assembly zone (FIG. 3). But the conveyance device 1 is also provided with second conveying means 40 which, for their part, are designed to move each bundle 2, 3 from the transfer zone to a strapping zone in which the flat objects forming said bundle 2, 3 are attached together (FIG. 4).

According to the subject of the present invention, the first conveying means 10 are also capable of longitudinally guiding the stack of folding boxes during the formation of each bundle 2, 3 in the assembly zone, but also of longitudinally holding said bundle 2, 3 during its movement from the assembly zone to the transfer zone.

According to a particular feature of the invention, the first conveying means 10 are first of all furnished with at least one pushing member 11, 12 which is capable of being positioned behind each bundle 2, 3 placed in the assembly zone (FIG. 2) and of pushing it to the transfer zone (dashed lines in FIG. 2) before being retracted (FIG. 3) in order to return to its initial position (FIGS. 4 and 5). But the first conveying means 10 are also provided with at least one holding member 21, 22 which is capable of being positioned in front of each bundle 2, 3 placed in the assembly zone (FIG. 2), and of advancing to the transfer zone in a manner concomitant with each pushing member 11, 12 (dashed lines in FIG. 2), before being retracted (FIG. 3) to return to its initial position (FIGS. 4 and 5).

In a particularly advantageous manner, each pushing member 11, 12 is capable of being made to move parallel to the axis of the strapping machine 100, by means of a drive mechanism 13 which is positioned beneath the space through which the bundles 2, 3 travel inside said strapping machine 100.

In this situation, the assembly is arranged so that each pushing member 11, 12 can be retracted downward in a substantially vertical direction according to FIG. 3.

In this exemplary embodiment, there are in fact two pushing members 11, 12 which are installed symmetrically on either side of the axis of the strapping machine 100 (FIG. 1). In effect, each pushing member 11, 12 takes the form of a vertical bar that is mounted transversely so as to move in translation in a direction parallel to the axis of the machine, by means of the drive mechanism 13. For this, each vertical bar is supported by a carriage 14 that is attached to a timing belt 15 stretched between an idler roller 16 and a driveshaft 17 coupled to an electric motor (not shown). For each pushing member 11, 12 to be able furthermore to be retracted vertically downward, each vertical bar is also mounted longitudinally so as to be able to move in translation relative to the carriage 14 that supports it, in a direction that is substantially perpendicular to the axis of the machine 100 (FIG. 3).

According to another advantageous feature, each holding member 21, 22 is capable of being made to move parallel to the axis of the strapping machine 100 by means of a drive mechanism 23 which is positioned beneath the space through which the bundles 2, 3 travel.

In this situation, the assembly is arranged so that each holding member 21, 22 can be retracted downward in a substantially vertical direction.

In a manner similar to what has been said about the pushing members 11, 12, there are two holding members 21, 22 that are installed symmetrically on either side of the axis of the strapping machine 100 (FIG. 1). Each holding member 21, 22 takes the form of a vertical bar that is mounted transversely so as to be able to move in translation in a direction parallel to the axis of the machine, by means of a drive mechanism 23. For this, each vertical bar is supported by a carriage 24 that is attached to a timing belt 25 stretched between an idler roller 26 and a driveshaft 27 coupled to an electric motor (not shown). For it to be able to be retracted vertically downward, each holding member 21, 22 is furthermore mounted longitudinally so as to be able to move in translation relative to the carriage 24 that supports it, in a direction substantially perpendicular to the axis of the machine 100 (FIG. 3).

According to another particular feature of the invention, the first conveying means 10 also comprise two lateral guides 31, 32 which extend on either side of the space through which the bundles 2, 3 travel, over a length going substantially from the assembly zone to the transfer zone. The assembly is moreover arranged so that the two lateral guides 31, 32 are capable, on the one hand, of transversely guiding the stack of folding boxes during the formation of each bundle 2,3 in the assembly zone, and, on the other hand, of transversely holding said bundle 2, 3 during its movement from the assembly zone to the transfer zone.

In a particularly advantageous manner, at least one lateral guide 31, 32 is mounted so as to be positionally adjustable in a transverse direction. This implies that the lateral guide 31, 32 in question is mounted so as to be able to move in translation transversely, and that it is coupled to adjustment means making it possible to precisely adjust its position.

According to a currently preferred embodiment of the invention, each lateral guide 31, 32 consists of a rack which extends substantially from the assembly zone to the transfer zone.

As can be clearly seen in the various figures, each rack comprises a plurality of parallel pins which extend substantially vertically with their ends oriented upward.

Such a structure is particularly advantageous when it is combined as in this exemplary embodiment with the use of a handling gripper 200 of a palletizing robot (not shown). This gripper 200 is chosen so as to have fingers 210 the spacing of which is compatible with that of the pins of the racks. The gripper 200 will then be capable of placing batches of folding boxes between the two racks, by descending virtually vertically, with the body of said gripper positioned on the outside of the assembly zone, and the fingers 210 pointing to the inside. The gripper 200 can then be withdrawn by moving it substantially horizontally, in a transverse direction relative to the axis of the machine.

According to another particular feature of the invention, the second conveying means 40 are first of all furnished with at least one pushing member 41, 42 which is capable of being positioned behind each bundle 2, 3 placed in the transfer zone (FIG. 3), and of pushing it to the strapping zone (FIG. 4) before being retracted in order to return to its initial position (FIG. 5). Moreover, the second conveying means 40 are also provided with two lateral guides 51, 52 which extend on either side of the space through which the bundles 2, 3 travel, over a length going substantially from the transfer zone to the strapping zone (FIG. 1). Finally, the second conveying means 40 also have at least one pressing member 61, 62 which is placed above the space through which the bundles 2, 3 travel, going from the transfer zone to the strapping zone. The assembly is arranged so that each pressing member 61, 62 is capable of vertically pressing each bundle 2, 3 traveling in the transit space defined above (dashed lines in FIG. 2 and FIG. 4).

In a particularly advantageous manner, each pushing member 41, 42 is capable of being made to move parallel to the axis of the strapping machine 100, by means of a drive mechanism 43 which is positioned above the space through which the bundles 2, 3 travel within the strapping machine 100.

In this situation, each pushing member 41, 42 is arranged so as to be able to be retracted upward in a substantially vertical direction.

In this exemplary embodiment, there are also two pushing members 41, 42 here which are installed symmetrically on either side of the axis of the strapping machine 100. In practice, each pushing member 41, 42 takes the form of a vertical bar which is mounted so as to be able to move transversely in translation in a direction parallel to the axis of the machine, by means of a drive mechanism 43. For this, each vertical bar is suspended on a carriage 44 that is attached to a timing belt 45 stretched between an idler roller 46 and a driveshaft 47 coupled to an electric motor (not shown). For each pushing member 41, 42 to be able furthermore to be retracted vertically upward, each vertical bar is also mounted so as to be able to move longitudinally in translation relative to the carriage 44 that supports it, in a direction that is substantially perpendicular to the axis of the machine 100.

According to another advantageous feature, at least one lateral guide 51, 52 is mounted so as to be positionally adjustable in a substantially transverse direction. This means, in other words, that the lateral guide 51, 52 concerned is mounted so as to be able to move in translation transversely, and that it is furthermore coupled to adjustment means making it possible to precisely adjust its position.

In this exemplary embodiment, the lateral guides 51, are two in number. According to FIG. 1, they are installed symmetrically on either side of the axis of the strapping machine 100 and take the form of two parallel vertical plates.

According to another particular advantageous feature of the invention, at least one pressing member 61, 62 is mounted so as to be positionally adjustable in a substantially transverse direction.

In this exemplary embodiment, there are again two pressing members 61, 62 which are installed symmetrically on either side of the axis of the strapping machine 100 as can be seen in FIG. 1. In practice, each pressing member 61, 62 takes the form of a substantially horizontal bar that is mounted so as to be able to move transversely in translation in a direction that is substantially perpendicular to the axis of the machine.

Naturally, the invention more generally relates to any strapping machine 100 capable of attaching together flat objects assembled into bundles 2, 3 and comprising at least one conveyance device 1 as described above.

The invention claimed is:

1. A conveyance device within a strapping machine, the conveyance device is for movement of a succession of bundles of stacked flat objects, the conveyance device comprising:
    a first conveyor configured for moving each bundle from an assembly zone, in which the bundle is formed from a stacking of flat objects, to a transfer zone in which the bundle is positioned outside the assembly zone;
    the first conveyor is also configured for longitudinally guiding the stack of the flat objects during the formation of each bundle in the assembly zone, and of longitudinally holding the bundle during the movement of the bundle from the assembly zone to the transfer zone; and
    the first conveyor comprises at least one first pushing member that is configured for being positioned behind each bundle placed in the assembly zone, is located and configured for pushing each bundle to the transfer zone before the first pushing member retracts to return to the initial position of the first pushing member, and
    is configured for retracting downward in a substantially vertical direction; and
    a second conveyor configured for moving each bundle from the transfer zone to a strapping zone in which the flat objects comprising the bundle are attached together, and
    the second conveyor comprises at least one second pushing member that is configured for being positioned behind each bundle placed in the transfer zone, is located and configured for pushing each bundle to the strapping zone before the second pushing member retracts to return to the initial position of the second pushing member, and is configured for retracting upward in a substantially vertical direction.

2. A conveyance device according to claim 1, wherein
the first conveyor comprises
at least one holding member that is configured for being positioned at the front of each bundle placed in the assembly zone, and of advancing up to the transfer zone in a manner concomitant with each pushing member before the holding member retracts to return to its initial position.

3. A conveyance device according to claim 2, wherein each pushing member is configured for moving parallel to an axis of the strapping machine; and
a drive mechanism that is positioned beneath the space through which the bundles travel and configured for driving each push member.

4. A conveyance device according to claim 2, wherein each holding member moves parallel to an axis of the strapping machine; and
a drive mechanism that is positioned beneath the space through which the bundles travel and configured for driving each holding member.

5. A conveyance device according to claim 2, wherein each holding member is retractable downward in a substantially vertical direction.

6. A conveyance device according to claim 1, wherein the first conveyor also comprises two lateral guides which extend on either side of the space through which the bundles travel along an axis of the device, over a length substantially from the assembly zone to the transfer zone; and
the two lateral guides are configured for transversely guiding the stack of the flat objects during the formation of each bundle in the assembly zone, and for transversely holding the bundle during its movement from the assembly zone to the transfer zone.

7. A conveyance device according to claim 6, wherein at least one of the lateral guides is mounted positionally adjustable in a substantially transverse direction.

8. A conveyance device according to claim 6, wherein each lateral guide comprises a rack which extends substantially from the assembly zone to the transfer zone.

9. A conveyance device according to claim 8, wherein each rack comprises a plurality of parallel pins which extend substantially vertically and the pins having ends oriented upward.

10. A conveyance device according to claim 1, wherein the second conveyor comprises
two lateral guides which extend on either side of the space through which the bundles travel, over a length substantially from the transfer zone to the strapping zone; and
at least one pressing member which is placed above the space through which the bundles travel while the bundles go from the transfer zone to the strapping zone, and the pressing member is configured for pressing vertically against each bundle traveling in the transit space.

11. A conveyance device according to claim 10, wherein each pushing member is configured for moving parallel to an axis of the strapping machine, and a drive mechanism which is positioned above a space through which the bundles travel and configured for moving each pushing member parallel to the axis of the strapping machine.

12. A conveyance device according to claim 10, wherein at least one of the lateral guides is mounted for being positionally adjustable in a substantially transverse direction with respect to an axis of the device.

13. A conveyance device according to claim 10, wherein at least one pressing member is mounted for being positionally adjustable in a substantially transverse direction with respect to an axis of the device.

14. A strapping machine for strapping flat objects bundled into bundles comprising at least one conveyance device according to claim 1.

* * * * *